Aug. 17, 1943. T. V. BUCKWALTER 2,326,993
TRUCK
Filed Nov. 5, 1941 2 Sheets-Sheet 1
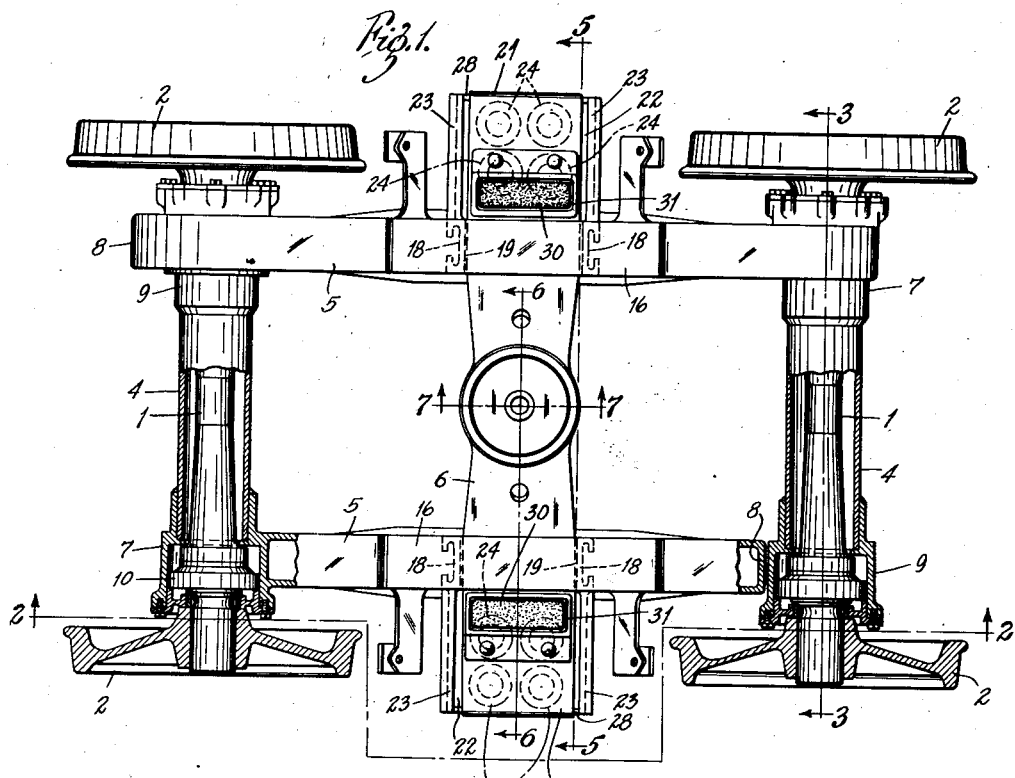
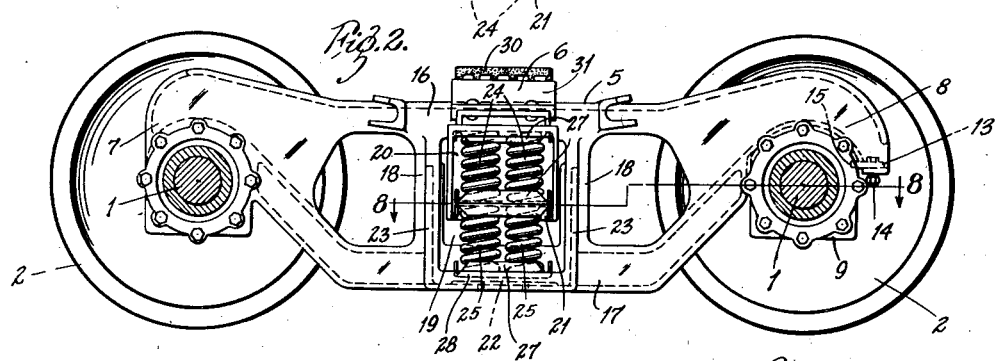
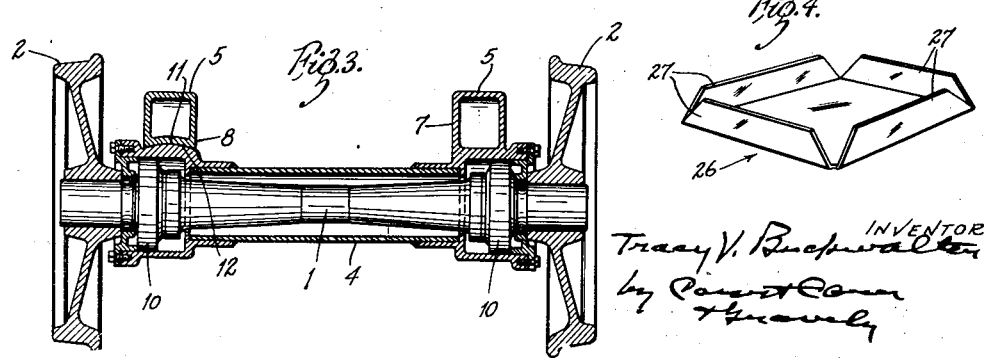
INVENTOR:
Tracy V. Buckwalter
HIS ATTORNEYS.

Aug. 17, 1943.    T. V. BUCKWALTER    2,326,993
TRUCK
Filed Nov. 5, 1941    2 Sheets-Sheet 2
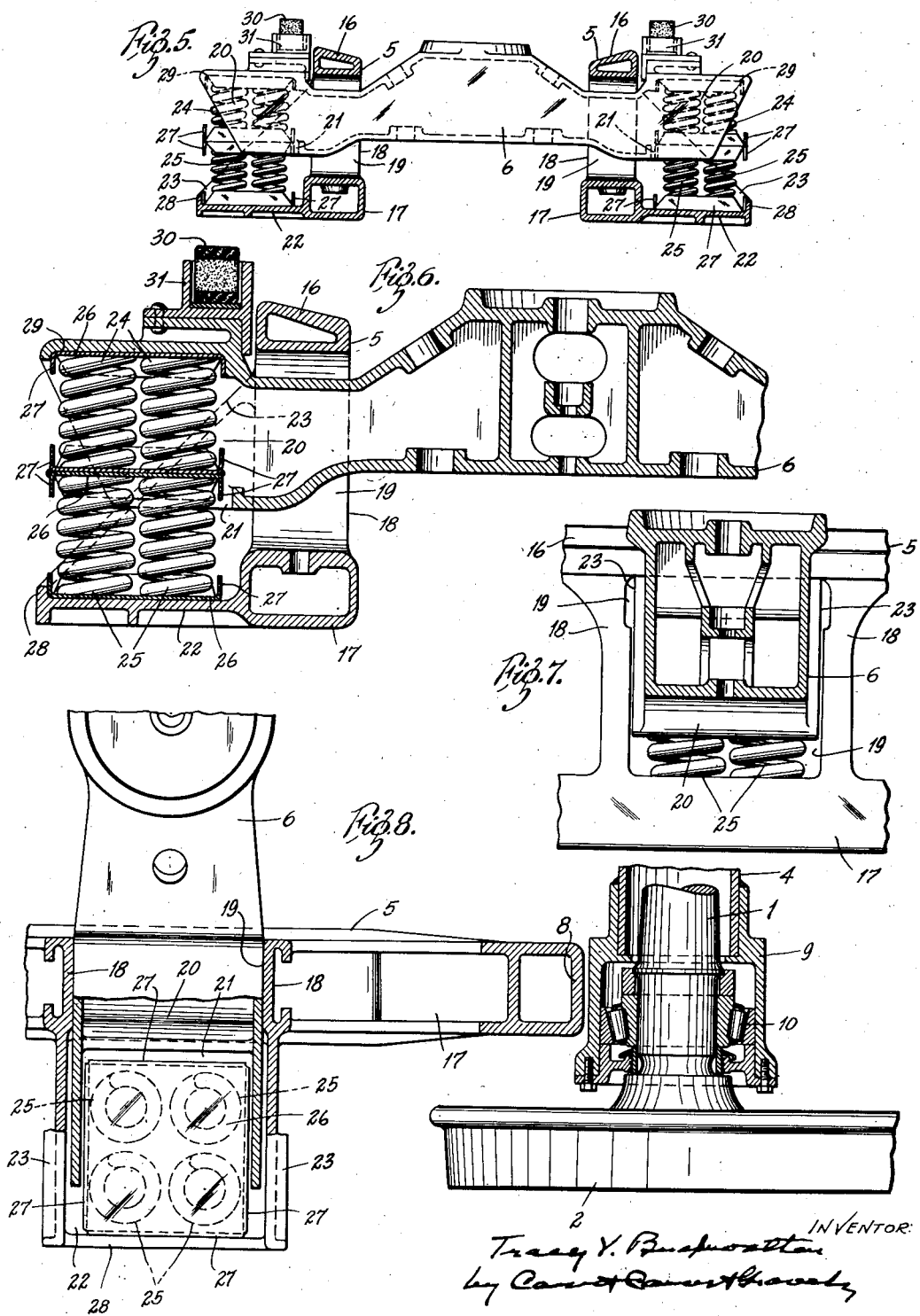

Patented Aug. 17, 1943

2,326,993

UNITED STATES PATENT OFFICE 2,326,993

TRUCK

Tracy V. Buckwalter, Canton, Ohio, assignor to The Timken Roller Bearing Company, Canton, Ohio, a corporation of Ohio Application November 5, 1941, Serial No. 417,877

10 Claims. (Cl. 105—182)

This invention relates to trucks, particularly spring-plankless inboard trucks of the kind shown in my Patent No. 1,640,180, dated August 23, 1927, wherein the side frames are rigidly connected to the axle housings at two diagonally opposite corners of the truck and are loosely connected to said housings at the other diagonal corners of said truck.

The invention has for its principal objects to devise an improved truck which will preserve all of the advantages of the above type of truck and, at the same time, improve the riding quality thereof under high speed operation, which will provide a strong and rigid outboard bolster spring mounting, and which will utilize the rigid connections between the side frames and the axle housings to prevent sidewise tilting of said frames due to the outboard mounting of said bolster springs.

The invention consists in the improved truck, and in the construction, combinations and arrangements of parts hereinafter described and claimed.

In the accompanying drawings, which form part of this specification and wherein like symbols refer to like parts wherever they occur, Fig. 1 is a part top plan and part horizontal sectional view of a railway car truck embodying my invention, Fig. 2 is a vertical longitudinal sectional view on the line 2—2 in Fig. 1, Fig. 3 is a vertical transverse sectional view on the line 3—3 in Fig. 1, Fig. 4 is an enlarged perspective view of one of the bolster spring plates or seats, Fig. 5 is a vertical transverse sectional view on the line 5—5 in Fig. 1, Fig. 6 is an enlarged fragmentary vertical transverse sectional view on the line 6—6 in Fig. 1, Fig. 7 is an enlarged fragmentary sectional view on the line 7—7 in Fig. 1; and Fig. 8 is an enlarged fragmentary horizontal sectional view on the line 8—8 in Fig. 2.

In the accompanying drawings, my invention is shown embodied in an inboard railway car truck of the type shown in my Patent No. 1,640,180, dated August 23, 1927, wherein a pair of axles 1 have wheels 2 fixed to the ends thereof, axle housings 4 enclose said axles, side frames 5 connect the axle housings and a cross beam or bolster 6 extends from side frame to side frame midway between said axles.

One end of each truck side frame 5 has a tubular portion 7 integral therewith that projects transversely therefrom on opposite sides thereof and has its inner end portion sleeved on and welded or otherwise rigidly secured to the adjacent end portion of an axle housing 4. The other end of each truck side frame 5 is formed with a downwardly opening jaw 8 that fits over a tubular member 9 that is welded or otherwise rigidly secured to the adjacent end of the other axle housing. The tubular side frame portions 7 and the tubular members 9 constitute end sections therefor and housings for conical roller bearings 10 that are interposed between the axles 1 and said end sections of said housings. The end section or extension 7 of each axle housing 4 has an upper convex spherical surface 11 and the upper portion of the side frame jaw 8 that straddles said extension has a concave spherical surface 12 that seats upon the convex spherical surface thereof. Clearance spaces are provided between the sides or legs of each side frame jaw 8 and the housing section 7 straddled thereby; and said jaw and housing section are releasably held together against vertical separation by means of a retaining plate 13 that is removably secured by bolts 14 to the underside of the outer leg of said jaw and seats loosely within horizontal grooves or notches 15 provided therefor in the adjacent side face of said housing section.

When the truck is assembled, the rigid corners thereof (that is the corners where the side frames are rigidly secured to the end members of the axle housing) are diagonally opposite; and the loose corners, (that is, those where the jaws of the side frames fit over the ends of the axle housing) are diagonally opposite.

By the arrangement described, the truck is at all times prevented from going out of square by the rigid connections between the side frames and axle housings at two diagonally opposite corners of the truck, while the loose connections between said side frames and housings at the other diagonal corners of the truck provide sufficient flexibility to enable the truck to accommodate itself to rough or uneven track.

Each side frame 5 comprises a truss structure including compression and tension members, 16 and 17, respectively, that converge towards the ends of said side frame and are connected midway of said ends by a pair of upright bolster or column guides 18 that form a double strut between said compression and tension members and cooperate therewith to form an opening 19 adapted to receive the adjacent end of the truck bolster 6. The bolster extends through the bolster openings 19 in the truck side frames and terminates outwardly thereof in deepened end portions 20 having pockets or recesses 21 therein that open through the bottom and ends of said bolster. The bottom or tension member 17 of each side frame has an outstanding shelf or bracket 22 on the outer face thereof below the bolster opening 19. This bracket is located below the outwardly extending end portion 20 of the bolster and is preferably formed integral with the side frame and integrally connected to the column guides 18 on opposite sides of the bolster opening 20 by means of triangular side flanges or gussets 23 that slope upwardly from the outer edge of said bracket to said column guides.

The bolster 6 is yieldably sustained on each truck side frame 5 for vertical movement relative thereto preferably by means of two superimposed standard A. A. R. four unit nests or groups of helical coil springs 24 and 25 supported on the shelf or bracket 22 on the outer side of said frame. Separate spring plates 26 are provided for the two groups of outboard bolster springs on each side frame, said plates having retaining flanges 27 along the four sides thereof. Two of these spring plates are welded together back to back and are interposed between the upper and lower groups of springs and form a cap for the lower spring group and a seat for the upper spring group. The spring plate, which forms the seat for the lower spring group, seats on the outstanding bracket 22 of the side frame between the side flanges 23 of said bracket and between an upstanding rib 28 at the outer edge thereof and the outer face of the tension member 17 of said side frame. The spring plate, which forms the cap for the upper group of springs seats in a recess 29 provided therefor in the top of the pocket 21 in the end of the bolster.

The bolster is provided outwardly of the truck side frames with side bearings for steadying the car and for preventing excessive rocking thereof. As shown in the drawings, each of these side bearings comprises a side bearing shoe 30 mounted in a side bearing pocket member 31 that seats on and is riveted or otherwise secured to the projecting end of the bolster in abutting relation to the outer side face of the compression member 16 of the adjacent truck side frame 5 thereof.

The hereinbefore described inboard truck construction has several important advantages. The outboard mounting of the bolster springs increases the distance between spring centers thereby improving the spring action, while the location of the bolster spring supporting brackets below the level of the bolster openings, together with the pockets in the ends of the bolster, provides sufficient vertical space between said bolster and said brackets to permit the use of superimposed spring sets at each end of the bolster. These double spring sets act in series, thereby giving double the deflection for the same spring load and also providing for soft spring action and improved riding qualities. This outboard mounting of the bolster springs also leaves the bolster openings clear of the springs and spring planks and thus provides for increased vertical movement of the bolster in said openings; it also enables the depth of the bolster ends to be increased; and it also permits the side bearings to be moved outwardly to correspond to the standard A. A. R. side bearing spacing. The outboard bolster spring supporting brackets are cast integral with the tension members of the side frames and have integral gusset connections with the column guides on opposite sides of the bolster openings. This outboard or eccentric mounting of the bolster springs on the side frames has a tendency to cause the side frames to tilt outwardly due to the eccentricity of the applied load. However, such tilting of the side frames is prevented by the rigid connection at one end of each side frame with the adjacent end of an axle housing, which arrangement results in a leverage action of more than four to one, so that a relatively small weight on said axle housing at the loose opposite end thereof will effectively resist any tendency for the side to tilt under the eccentrically applied load.

Obviously, the hereinbefore described construction admits of considerable modification without departing from the invention. Therefore, I do not wish to be limited to the precise arrangement shown and described.

What I claim is:

1. A spring-plankless inboard car truck comprising wheeled axles, housings enclosing said axles between the wheels thereon, side frames connecting said housings and having openings therein, said side frames comprising truss structures extending substantially straight from housing to housing, groups of vertically disposed coil springs supported on the respective side frames opposite to but entirely outside of the openings therein, and a bolster extending through and outwardly beyond said side frame openings with its projecting ends supported on said springs, said side frames having outstanding horizontal brackets rigid therewith on the outer sides thereof below the level of the bottoms of the openings therein and constituting the sole supports for said springs.

2. A spring-plankless inboard car truck comprising wheeled axles, housings enclosing said axles between the wheels thereon, side frames connecting said housings and having openings therein, springs supported on the respective side frames entirely outside of the openings therein, a bolster extending through and outwardly beyond said side frame openings with its projecting ends supported on said springs, said side frames having outstanding brackets rigid therewith on the outer sides thereof adjacent to the bottoms of the openings therein and constituting the sole supports for said springs, and side bearings mounted on the projecting ends of said bolster in abutting relation to the outer side faces of said side frames.

3. A spring-plankless inboard car truck comprising wheeled axles, housings enclosing said axles between the wheels thereon, side frames connecting said housings and having openings therein, said side frames comprising truss structures extending substantially straight from housing to housing, springs supported on the respective side frames opposite to but entirely outside of the openings therein, and a bolster extending through and outwardly beyond said side frame openings with its projecting ends supported on said springs, one end of each side frame having a rigid connection with the adjacent end of one of said housings, whereby said housing is adapted to resist outward tilting of said side frame due to the outboard mounting of the bolster supporting springs thereon.

4. A spring-plankless inboard car truck comprising wheeled axles, housings enclosing said axles between the wheels thereon, side frames connecting said housings and having openings therein, said side frames comprising truss structures extending substantially straight from housing to housing, springs supported on the respective side frames opposite to but entirely outside of the openings therein, and a bolster extending through and outwardly beyond said side frame openings with its projecting ends supported on said springs, said side frames having outstanding horizontal brackets rigid therewith on the outer sides thereof below the level of the bottoms of the openings therein and constituting the sole supports for said springs, one end of each side frame having a rigid connection with the adjacent end of one of said housings, whereby said housing is adapted to resist outward tilting of said side frame due to the outboard mounting of the bolster supporting springs thereon.

5. A spring-plankless inboard car truck comprising a pair of wheeled axles, housings enclosing said axles between the wheels thereon, side frames connecting said housings and having openings therein, said side frames comprising truss structures extending substantially straight from housing to housing, roller bearings interposed between said axles and housings, groups of springs supported on the respective side frames entirely outside of the openings therein, and a bolster extending through and outwardly beyond said side frame openings with its projecting ends supported on said springs, said side frames having outstanding brackets rigid therewith on the outer sides thereof below the level of the openings therein and constituting the sole supports for said springs, one end of each side frame having a loose connection with the adjacent end of one of said housings and having its other end rigidly connected to the adjacent end of the other housing, whereby outward tilting of each side frame due to the outboard mounting of the bolster supporting springs thereon is resisted by the axle housing rigid therewith.

6. A spring-plankless inboard car truck comprising wheeled axles, housings enclosing said axles between the wheels thereon, side frames connecting said housings and having openings therein, superimposed groups of coil springs supported on the respective side frames entirely outside of the openings therein, and a bolster extending through and outwardly beyond said side frame openings with its projecting ends supported on said springs and with clear spaces between the underside of said bolster and the bottoms of said openings, said side frames having outstanding brackets integral therewith on the outer sides thereof just below the level of the openings therein and constituting the sole supports for said springs.

7. A spring-plankless inboard car truck comprising wheeled axles, housings enclosing said axles between the wheels thereon, side frames connecting said housings and having openings therein, superimposed groups of coil springs sustained by the respective side frames entirely outside of the openings therein, and a bolster extending through and outwardly beyond said side frame openings with its projecting ends supported on said springs with clear spaces between the underside of said bolster and the bottoms of said openings, said side frames having outstanding brackets integral therewith on the outer sides thereof adjacent to the bottoms of the openings therein and constituting the sole supports for said springs, and side flanges integral with said brackets and said side frames on opposite sides of the openings therein.

8. A spring-plankless inboard car truck comprising a pair of wheeled axles, housings enclosing said axles between the wheels thereon, roller bearings interposed between said axles and housings, side frames connecting said housings and having openings therein, superimposed groups of coil springs sustained by the respective side frames entirely outside of the openings therein, and a bolster extending through and outwardly beyond said side frame openings with its projecting ends supported on said springs with clear spaces between the underside of said bolster and the bottoms of said openings, said side frames having outstanding brackets integral therewith on the outer sides thereof adjacent to the bottoms of the openings therein and constituting the sole supports for said springs, and side flanges integral with said brackets and said side frames on opposite sides of the openings therein, one end of each side frame having a loose connection with the adjacent end of one of said housings and having its other end rigidly connected to the adjacent end of the other housing, whereby outward tilting of each side frame due to the outboard mounting of the bolster supporting springs thereon is resisted by the lever arm formed by the axle housing rigid therewith.

9. A truck side frame and axle housing assembly adapted for application as a complete unit to a car truck, said assembly comprising a truss type side frame and an axle housing rigidly connected to one end of said side frame at right angles thereto, the other end portion of said side frame being adapted for loose connection with the axle housing of a similar side frame and axle housing assembly, said side frame having a bolster opening therethrough and an outstanding bolster spring supporting bracket rigid therewith on the outer side face thereof below the level of the bottom of the bolster opening therein.

10. A truck side frame and axle housing assembly adapted for application as a complete unit to a car truck, said assembly comprising a side frame and an axle housing rigidly connected to one end of said side frame at right angles thereto, the other end portion of said side frame being adapted for loose connection with the axle housing of a similar side frame and axle housing assembly, said side frame having a bolster opening therethrough and an outstanding bolster spring supporting bracket integral therewith on the outer side face thereof below the level of the bottom of the bolster opening therein, and side flanges integral with said bracket and said side frame on opposite sides of said bolster opening.

TRACY V. BUCKWALTER.